United States Patent [19]
Grisnich

[11] 4,161,243
[45] Jul. 17, 1979

[54] FALL BRAKE

[76] Inventor: Marius Grisnich, No. 9, Punterstraat, Emmeloord, Netherlands

[21] Appl. No.: 821,915

[22] Filed: Aug. 4, 1977

[30] Foreign Application Priority Data

Aug. 25, 1976 [NL] Netherlands ............... 7609467

[51] Int. Cl.² ......................................... B65G 11/08
[52] U.S. Cl. .................................. 193/27; 193/32
[58] Field of Search .............. 193/7, 15, 25 E, 27, 193/28, 32, 35 R, 35 A, 35 F, 36; 198/523, 534; 214/12, 14

[56] References Cited

U.S. PATENT DOCUMENTS

| | | | |
|---|---|---|---|
| 997,276 | 7/1911 | Curtis | 193/32 X |
| 1,230,820 | 6/1917 | Levalley et al. | 193/32 X |
| 1,583,833 | 5/1926 | Howell | 193/32 X |
| 2,502,341 | 3/1950 | Queirold | 193/27 |
| 3,926,290 | 12/1975 | Isojima et al. | 193/27 |

FOREIGN PATENT DOCUMENTS

| | | | |
|---|---|---|---|
| 1385615 | 12/1965 | France | 193/7 |
| 303234 | 1/1929 | United Kingdom | 193/27 |

*Primary Examiner*—Robert B. Reeves
*Assistant Examiner*—James L. Rowland
*Attorney, Agent, or Firm*—John P. Snyder

[57] ABSTRACT

A fall brake for material in which a plurality of frames are suspended one beneath the other, each frame holding a material guide. The frames are pivotally interconnected in staggered positions and the lowermost frame is suspended to a lifting mechanism through a flexible member. In order to prevent the risk of damage in the case of shocks and to provide a small height of the fall brake in the lifted position, the lowermost frame can be upwardly pivoted from its operative position into an inoperative position, in which the frame is mainly parallel to the overlying frame, each frame having suspended to it a material guide being at an angle to said frame.

10 Claims, 8 Drawing Figures

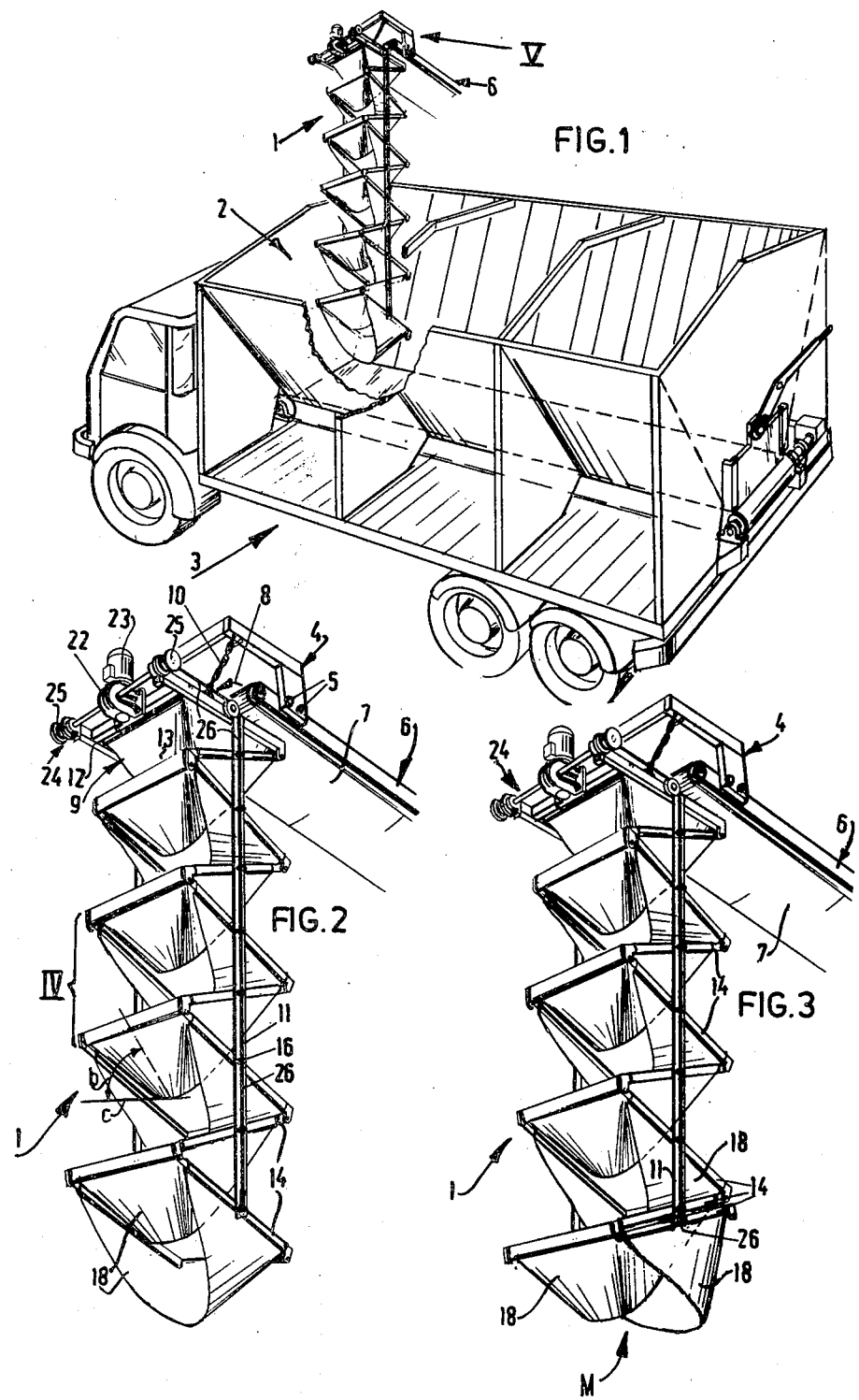

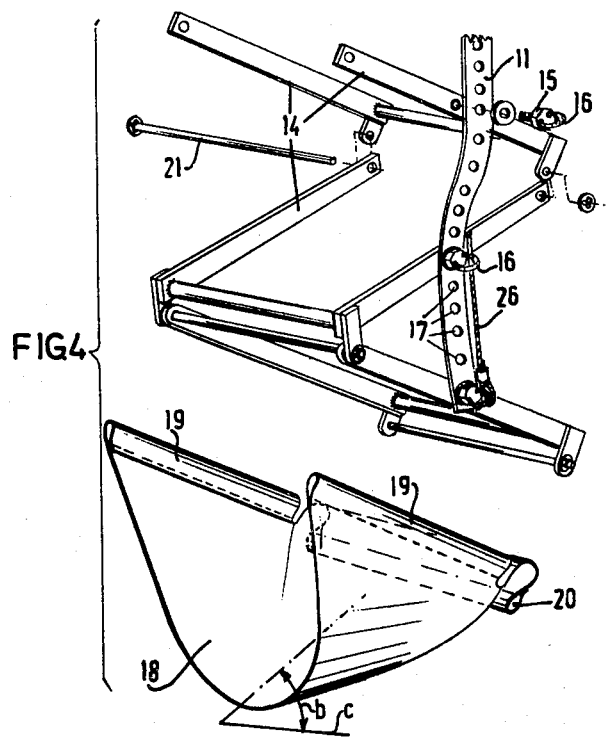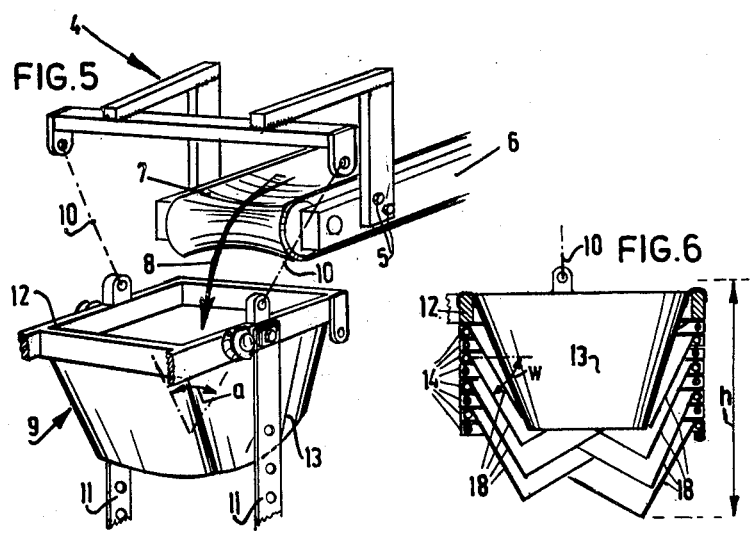

FALL BRAKE

The invention relates to a fall brake for material comprising suspension means and a plurality of frames suspended to said means one beneath the other and holding each a material guide directed downwards in a sense opposite that of the overlying material guide, wherein the frames are pivotally interconnected in staggered positions and at least the lowermost frame is suspended to a lifting mechanism through at least one flexible member.

Such a fall brake is known from U.S. Pat. No. 2,513,696 and is used for avoiding damage of the material when falling down. This may be the case in shedding potatoes in a container or on a floor. The falling speed is progressively reduced by means of this fall brake by changing the direction of the fall. The fall brake as disclosed in said U.S. patent specification comprises frames which are connected to each other as a multiple scissors. When upwardly pivoting the lowermost frame the overlying frames correspondingly pivot as a result of a parallel rod mechanism, so that said frames remain alternately parallel to each other. As a result the way covered by the material remains as long, but the inclination of all material guides becomes less steep.

The invention has for its object to provide a fall brake of the kind set forth, which has a small height in the lifted position and readily passes the material, whilst the risk of damage in the case of shocks is slight and the manufacture is simple. According to the invention the lowermost frame can be upwardly pivoted from its operative position into an inoperative position, in which the frame is mainly parallel to the overlying frame, each frame having suspended to it a material guide being at an angle to said frame.

The above-mentioned and further features of the invention will now be described more fully with reference to a drawing.

In the drawing:

FIG. 1 is a perspective view of a fall brake in accordance with the invention for loading the trough of a vehicle, FIG. 2 shows on an enlarged scale the fall brake of FIG. 1, FIG. 3 shows on an enlarged scale the fall brake of FIG. 1 in a different position.

FIG. 4 shows on an enlarged scale an exploded view of a detail IV in FIG. 2,

FIG. 5 is a perspective view of a detail V of FIG. 1, and

FIG. 6 shows on an enlarged scale the fall brake of FIG. 1 in the fully retracted position.

Figure 7:
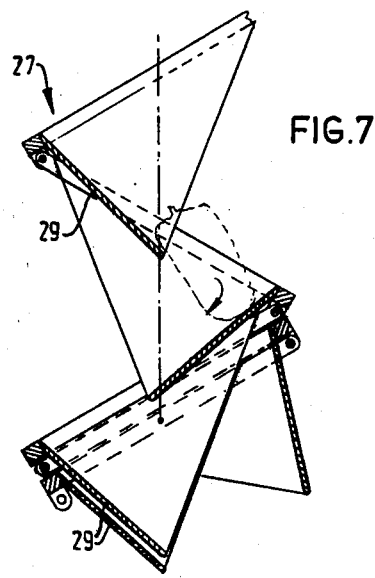
FIG. 7 is a vertical sectional view of a different fall brake in accordance with the invention.

The fall brake 1, which is employed, by way of example, in loading a trough 2 of a vehicle 3, comprises a console 4 to be fastened by bolts 5 to the frame 6 of a conveyor belt 7 feeding material in the direction of the arrow 8 or to the top end of a bunker. A funnel 9 is suspended to the console 4 by means of two hangers 10 formed by chains and being at an acute angle a to one another, so that the funnel 9 is flexibly suspended, but automatically occupies its central position beneath the end of the conveyor belt 7. The funnel 9 comprises a framework 12 to which a converging sheath 13 is fastened on the bottom side.

The fall brake 1 comprises, furthermore, suspension means formed by two flexible members, preferably belts 11 suspended to the framework 12. The fall brake 1 furthermore comprises a plurality of frames 14 pivoted to one another in staggered positions and suspended approximately at their centers to the two belts 11 by means of screw bolts 15 having eyelets 16. For this purpose each belt 11 has for each frame 14 a plurality of holes 17, the screw bolts 15 being passed through selected holes 17 so that the frames 14 and the material guides 18 supported thereby will occupy the inclined position matching the material to be treated. Each material guide 18 consists of a sheet of solid, flexible material suspended by two side edges 19 to the frame 14 and by a top edge 20 to a pivotal rod 21, which pivotally interconnects two frames 14. The topmost frame 14 is pivotally suspended to the framework 12 of the funnel 9.

The framework 12 of the funnel 9 holds, in addition, a winch 22 of a lifting mechanism 24 driven by an electric motor 23. The lowermost frame 14 is suspended to the lifting mechanism 24 by means of two cables 26 wound on winch drums 25 of the winch 22 and passed through the eyelets 16.

Each material guide 18 is directed downwards and (with the exception of the topmost guide) it extends in a sense opposite that of the overhanging material guide 18.

FIGS. 1 and 2 illustrate that material such as potatoes, fruit or other vulnerable produce can be conveyed to a great depth into a container 2. Accordingly as the level in the container 2 rises, the cables 26 are shortened, whilst a frame 14 each time joins the overlying frame 14. During this movement the angle of inclination b of the material guide 18 to the horizontal c increases, which has the advantage that the material readily leaves the material guide 18 drawn up last without the risk of being jammed. The material guides 18 connected with the lifted frames 14 extend in alternating positions closely and parallel to one another so that they will not hamper the passage of material (see FIG. 6). For this purpose the material guides 18 are at an angle w to the associated frame 14 of 50° to 90°, preferably about 70°.

Thus, it will be seen that the device when fully or partly extended causes the articles being handled to follow a zig-zag path during free fall thereof whereby such free fall is reduced to discrete, small drops each of which is small enough to prevent damage to the articles. Each intercepting element (except the uppermost one) is pivotally connected at one end to an opposite end of the next uppermost element and each guide 18 has a portion which inclines downwardly and inwardly from the opposite end thereof, when the element is downwardly swung, by an amount sufficient to intercept the free fall of an article. However, because the inward extension of each such guide portion of a downwardly swung element is limited, such guide portion will open apart in jaw-like fashion with respect to the next uppermost guide portion as such lowermost element is swung upwardly, ultimately to define a mouth M through which the article may freely pass. Such a mouth between the two lowermost guide 18 is shown in FIG. 2. In fully retracted position, as in FIG. 6, each guide defines such a mouth with respect to each next uppermost guide so that, in effect, none of the intercepting elements is operative. In fact the material drops transversely through the frames 14.

In the lifted position shown in FIG. 6 the fall brake 1 has a small height h and an unhindered passage for material. Damage of the fall brake 1 is avoided by the use of flexible suspension means such as chains 10 and belts 11 and by using U-shaped, pivotally interconnected frames 14.

The lifting mechanism 24 may be automatically and continuously controlled by means of a level scanner (not shown).

Figure 8:
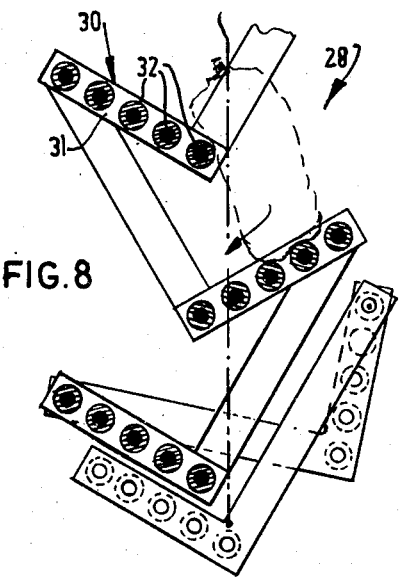
FIG. 8 is a vertical sectional view of a still different fall brake in accordance with the invention.

For braking bags filled with material the fall brake 27 or 28 shown in FIG. 7 and FIG. 8, respectively, may be employed. The fall brake 27 differs from the fall brake 1 only in that each material guide 29 is formed by a chute of sheet material, the dimensions being, of course, adapted to the size of the bags to be braked.

The fall brake 28 is distinguished from the fall brake 27 only in that each material guide 30 is formed by a grating 31, in which rollers 32 are rotatably journalled.

What I claim is:

1. A fall brake for material comprising a plurality of frames, suspension means for suspending said frames one beneath the other, each frame having a material guide directed downwards in a sense opposite that of the overlying material guide, wherein the frames are povitally interconnected in staggered positions and said suspension means includes at least one flexible member extending from a lifting mechanism and connected at least to the lowermost frame, characterized in that the lowermost operative frame can be upwardly pivoted from its operative position into an inoperative position in which the frame is mainly parallel to the overlying frame and in that each frame has suspended to it a material guide extending downwardly at an angle to said frame, said suspension means including a belt having holes for suspending said frames at intervals along its length and wherein in order to regulate the angle of inclination of the material guide the belt has a plurality of suspension holes.

2. A device for repeatedly intercepting articles and the like during free fall thereof to cause them to follow a zig-zag path in which such free fall is reduced to discrete, small drops each of which is small enough to prevent damage to the articles and the like, said device comprising, in combination:

a plurality of intercepting elements disposed serially in end-to-end pivotally connected relation to define an extensible and retractable zig-zag series of such elements;

means interconnecting said elements for allowing them to assume a fully extended position in suspended relation from the uppermost element of said series wherein the vertical spacing between the lowermost and uppermost elements of said series is a predetermined maximum;

raising/lowering means connected to and suspending said lowermost element for selectively retracting and extending said zig-zag series of elements from and to said fully extended position; and pivot means freely pivotally connecting one end of each element, except said uppermost element, to an opposite end of that element immediately above it for allowing said elements to swing upwardly into contact with one another in a sequential upward progression as said series is retracted and to swing downwardly toward their fully extended positions in a sequential downward progression as said series is extended;

each element including a guide portion which inclines downwardly and inwardly from said opposite end of such element when such element is in downwardly swung position and each individual guide portion extending inwardly by that amount necessary to intercept, after one of said small drops, an article and the like discharged from the next uppermost guide portion when the element of such individual guide portion is in downwardly swung position but to allow such individual guide portion to open in jaw-like fashion with respect to said next uppermost portion to define a mouth through which an article and the like discharged from the next uppermost guide portion may freely pass when said such element is in its upwardly swung position.

3. A device as defined in claim 2 wherein each guide portion extends at an angle of 90° to 50° to a plane passing through the opposite ends of the associated element.

4. A device as defined in claim 2 wherein each guide portion extends at an angle of about 70° to a plane passing through the opposite ends of the associated element.

5. A device for repeatedly intercepting articles and the like during free fall thereof to cause them to follow a zig-zag path in which such free fall is reduced to discrete, small drops each of which is small enough to prevent damage to the articles and the like, said device comprising in combination:

a plurality of intercepting elements disposed serially in end-to-end pivotally connected relation to define an extensible and retractable zig-zag series of such elements in which one end of each element is pivotally connected to an opposite end of a next uppermost element;

means for swinging one element upwardly into closing relation with an element above it successively upwardly from the lowermost element of said series whereby to retract said series of elements;

each element including a guide portion which inclines downwardly and inwardly from said opposite end of that element when that element is in downwardly swung position and each individual guide portion extending inwardly by that amount necessary to intercept, after one of said small drops, an article and the like discharged from the next uppermost guide portion when the element of such individual guide portion is in downwardly swung position but to allow such individual guide portion to open in jaw-like fashion with respect to the next upper-most guide portion to define a mouth through which an article and the like discharged from the next uppermost guide portion may freely pass when said that element is in upwardly swung position.

6. A device as defined in claim 5 wherein each guide portion extends at an angle of 90° to 50° to a plane passing through the opposite ends of the associated element.

7. A device as defined in claim 5 wherein each guide portion extends at an angle of about 70° to a plane passing through the opposite ends of the associated element.

8. A device for repeatedly intercepting articles and the like during free fall thereof to cause them to follow a zig-zag path in which such free fall is reduced to discrete, small drops each of which is small enough to prevent damage to the articles and the like, said device comprising, in combination:

at least two intercepting elements pivotally connected in end-to-end relation;

suspension means for normally suspending said elements in downwardly extending zig-zag relation and including means for swinging the lowermost element upwardly toward the other element;

said intercepting elements, when downwardly swung, presenting a vertically displaced pair of guide portions, one associated with each element, the upper guide portion extending downwardly and inwardly from one side of the device and the lower guide portion extending downwardly and inwardly from the opposite side of said device and said guide portions being of lengths to define a zig-zag path for an article and the like when the two elements are downwardly swung but to open apart in jaw-like fashion when the elements are upwardly swung to define a mouth through which an article and the like may freely pass.

9. A device as defined in claim 8 wherein each guide portion extends at an angle of 90° to 50° to a plane passing through the opposite ends of the associated element.

10. A device as defined in claim 8 wherein each guide portion extends at an angle of about 70° to a plane passing through the opposite ends of the associated element.

* * * * *